United States Patent [19]
Buonome

[11] Patent Number: 5,582,008
[45] Date of Patent: Dec. 10, 1996

[54] TWO STAGE TURBINE WITH PISTON/CYLINDER ASSEMBLY POSITIONED THEREBETWEEN

[76] Inventor: Frank Buonome, 196 N. High St., East Haven, Conn. 06512

[21] Appl. No.: 323,865

[22] Filed: Oct. 17, 1994

[51] Int. Cl.⁶ ............................. F16D 31/02; F01D 1/02
[52] U.S. Cl. .................. 60/398; 60/501; 60/506; 415/198.1
[58] Field of Search ............................. 60/325, 495, 497, 60/501, 506, 398, 413, 415; 415/198.1, 199.1

[56] References Cited

U.S. PATENT DOCUMENTS 4,454,429  6/1984  Buonome .................. 60/495 X
4,769,987  9/1988  Arnold ...................... 60/325

Primary Examiner—John E. Ryznic
Attorney, Agent, or Firm—Robert H. Montgomery

[57] ABSTRACT

A turbine comprising first and second stages, the first stage being a power stage and the second stage being an exhaust stage, a piston-cylinder assembly is connected between the stages, a shaft extending between the stages has at least one throw thereon in the piston-cylinder assembly and pressure conduit means extend from the first stage to the second stage and to the piston-cylinder assembly whereby the fluid pressure from the first stage drives the piston-cylinder assembly and acts on the second stage to cause the second stage to exhaust fluid from the turbine to a reservoir therefor. Fluid is supplied to the turbine from a pressure source and the turbine exhausts fluid to the reservoir, and further including means for transferring the fluid from the reservoir back to the pressure source.

20 Claims, 5 Drawing Sheets

TWO STAGE TURBINE WITH PISTON/CYLINDER ASSEMBLY POSITIONED THEREBETWEEN

FIELD OF THE INVENTION

This invention relates to turbines and more particularly to fluid-driven turbines.

BACKGROUND OF THE INVENTION

U.S. Pat. No. 4,454,429 discloses apparatus for converting the available energy from water motion to electrical energy. The apparatus of this patent depends upon the energy from the rise and fall of water level, caused by waves or tidal changes converted to be stored as hydraulic energy. The controlled release of this hydraulic energy is transferred via a turbine electric generator combination to a continuous source of electrical energy.

The disclosure of U.S. Pat. No. 4,454,429 is incorporated herein by reference, particularly FIG. 1 thereof which is hereinafter included in this specification.

The apparatus of U.S. Pat. No. 4,454,429 requires the existence of a turbine to drive a generator which will produce electrical power.

The present invention is directed to a new and improved turbine operating on the existence of hydraulic power, as will hereinafter be described.

An object of this invention is to provide a new and improved, hydraulically driven turbine.

Another object of this invention is to provide a new and improved design for a fluid or hydraulically powered turbine which will drive a generator.

A further object of this invention is to provide a new and improved non-free flowing turbine which is economical and efficient in operation.

A still further object of this invention is to provide a new and improved turbine which will operate on variable fluid pressure.

SUMMARY OF THE INVENTION

Briefly stated, the invention in one form thereof, comprises a turbine comprising first and second stages, the first stage being a power stage and the second stage being an exhaust stage. A piston-cylinder assembly is connected between said stages. A shaft extending between said stages has at least one throw thereon in the piston-cylinder assembly and pressure conduit means extend from the first stage to the second stage and to the piston-cylinder assembly whereby the fluid pressure from the first stage drives the piston-cylinder assembly and acts on the second stage to cause the second stage to exhaust fluid from the turbine to a reservoir therefor. Fluid is supplied to the turbine from a pressure source and the turbine exhausts fluid to the reservoir, and further means is provided for transferring the fluid from the reservoir to the pressure source.

The features of the invention which are believed to be novel are particularly pointed out and distinctly claimed in the concluding portion of this specification. The invention may be best appreciated together with further objects and advantages thereof by reference to the drawings and the following detailed description.

DETAILED DESCRIPTION OF THE INVENTION

Figure 1:
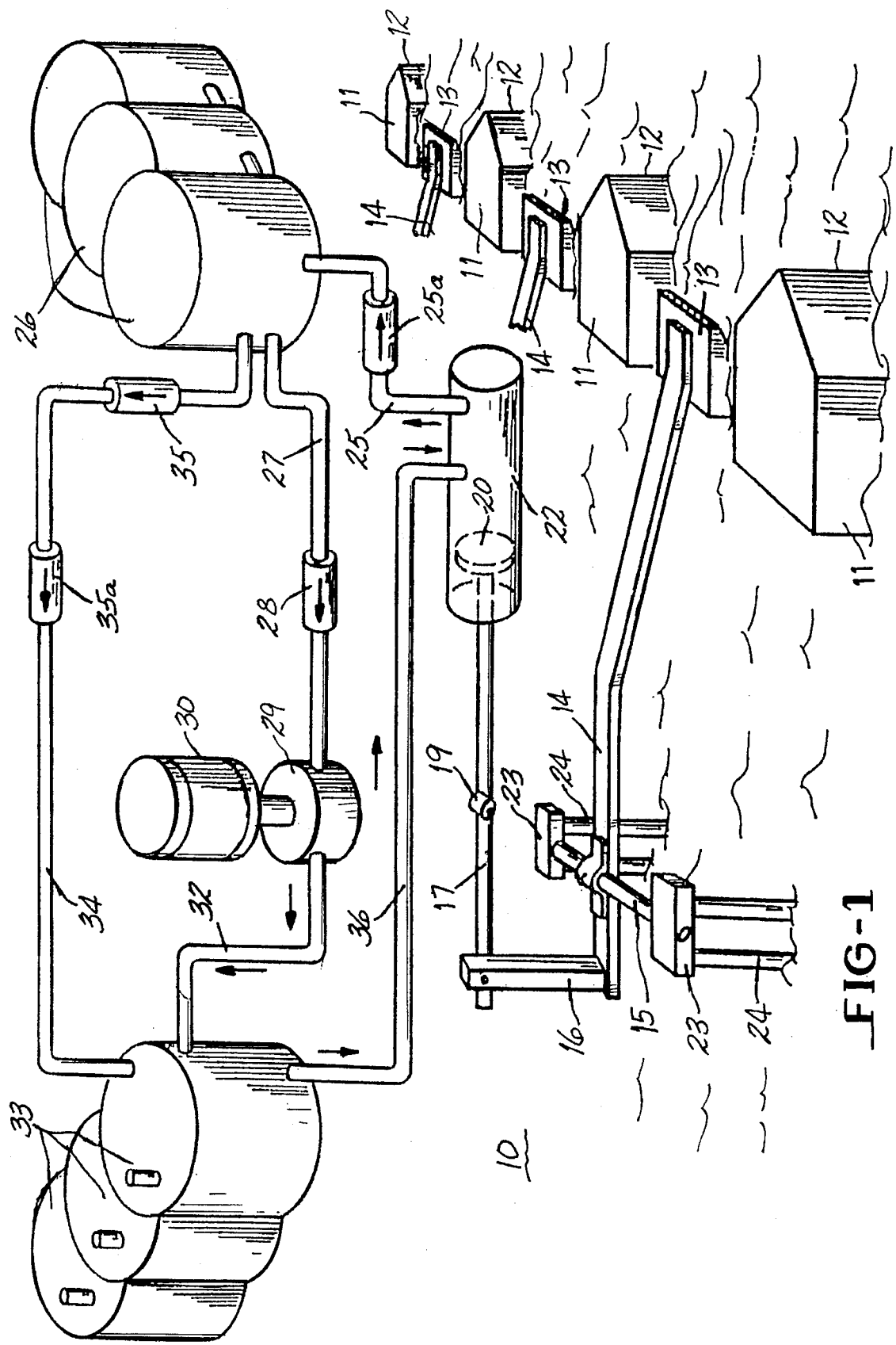
FIG. 1 is a drawing of a system which may utilize the turbine of the present invention and which has previously been disclosed in U.S. Pat. No. 4,454,429.

An environment in which the invention may be utilized is first discussed. This environment comprises a system 10 FIG. 1, as disclosed in U.S. Pat. No. 4,454,429 for utilizing water wave energy to generate power. The disclosure of this patent is incorporated herein by reference.

The system comprises two or more vertical pillars 11 with knife edges 12 directed toward inflowing water from an ocean or bay.

A series of floats 13 are positioned between the pillars 11. The floats have arms 14 connected thereto which are pivotally connected to rods 15 (only one shown) which will substantially vertically reciprocate posts 16. The posts 16 are pivotally connected to shafts 17 which are connected to piston rods 19a at a pivot point 19. Piston rod 19a with piston 20 is received in an elongated cylinder 22. Rod 15 is pivotally supported on brackets 23 which may be supported on pilings 24 mounted on shore or offshore.

As thus far described, when water motion strikes the pillars 11, the water motion is channeled between the pillars producing a higher water level than an undiverted wave. Thus, the incoming and outgoing waves will produce substantial vertical movement of posts 16 and resulting reciprocation of piston 20.

Hydraulic fluid displaced by piston 20 in cylinder 22 is transferred via line 25 including check valve 25a to accumulator tanks 26. The pressurized fluid in the accumulator tanks 26 is connected over a line 27 including pressure or flow-regulating valve 28 to a turbine 29 which drives a generator 30. The exhaust hydraulic fluid is transferred from turbine 29 via line 32 to one or more reservoir tanks 33.

Any excess pressure in accumulator tanks 26 is vented to reservoir tanks 33 via a dump line 34 which includes a metering valve 35 and a check valve 35a. Hydraulic fluid stored in the reservoirs 33 is returned to cylinder 22 via line 36.

The present invention is directed to a new and improved turbine identified by the reference numeral 29 as shown in FIG. 1.

Figure 2:
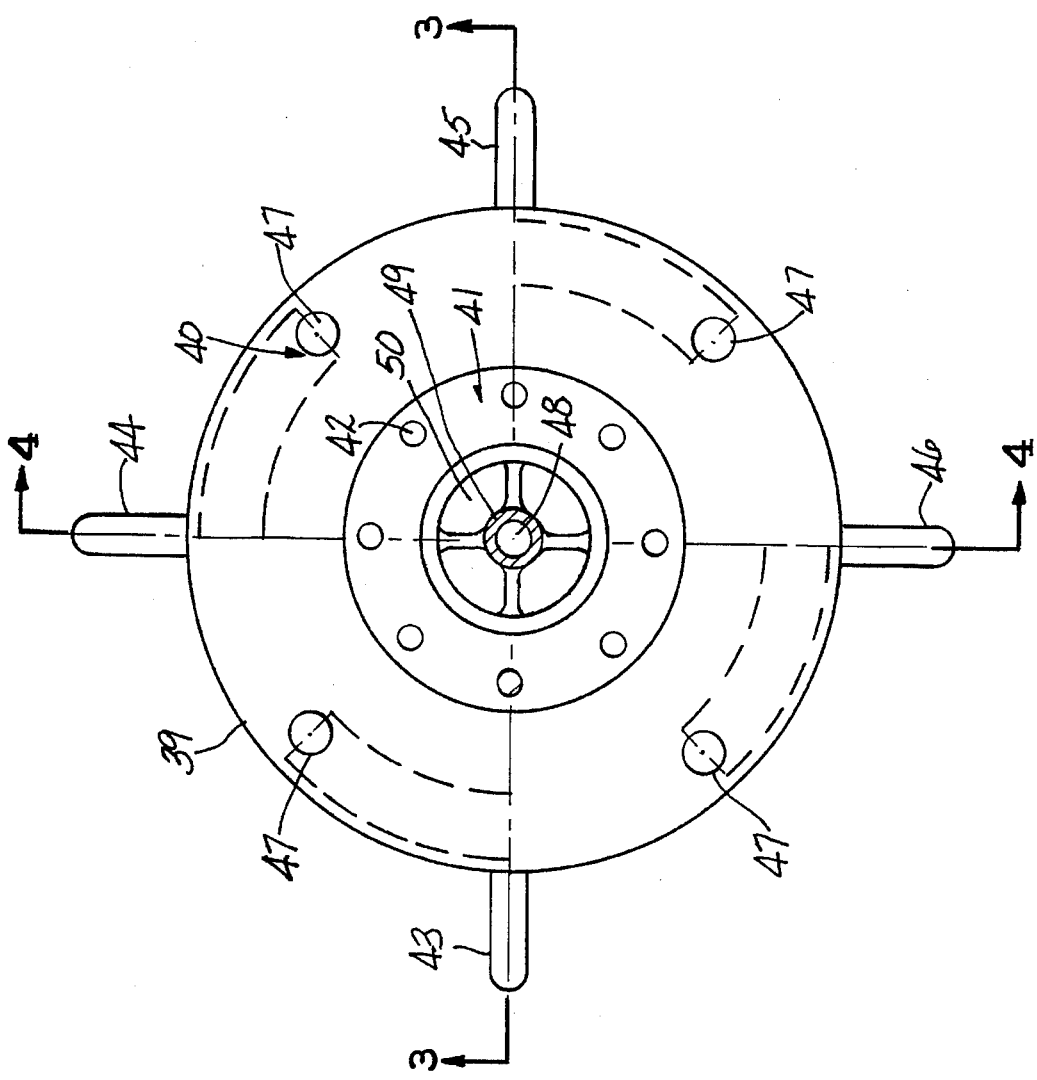
FIG. 2 is an end-view of a turbine embodying the present invention.

FIG. 2 shows an end view of a turbine 29 embodying the invention, seen from the input end of a first or pressure stage 39. First or pressure stage 39 has an end plate 40 which has attached thereto an input adaptor 41 secured thereto by means of bolts 42. FIG. 2 also shows pressure conduits or lines 43–46 hereinafter more fully described. The turbine as described is made of a series of laminated parts secured together with bolts 47. However, the turbine casing may be made of castings which are appropriately secured together to provide the appropriate construction. End plate 40 supports a shaft 48 in a bearing 49 and has openings 50 therein to permit fluid to enter stage 39.

Figure 5:
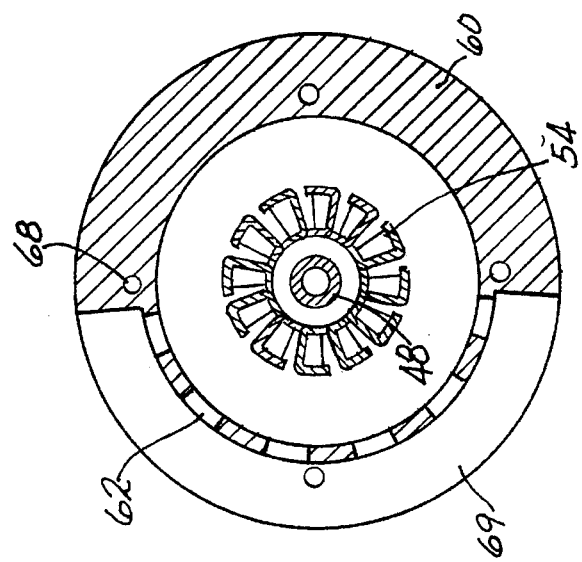
FIG. 5 is a view seen in the plane of lines 5—5 of FIG. 3.
Figure 6:
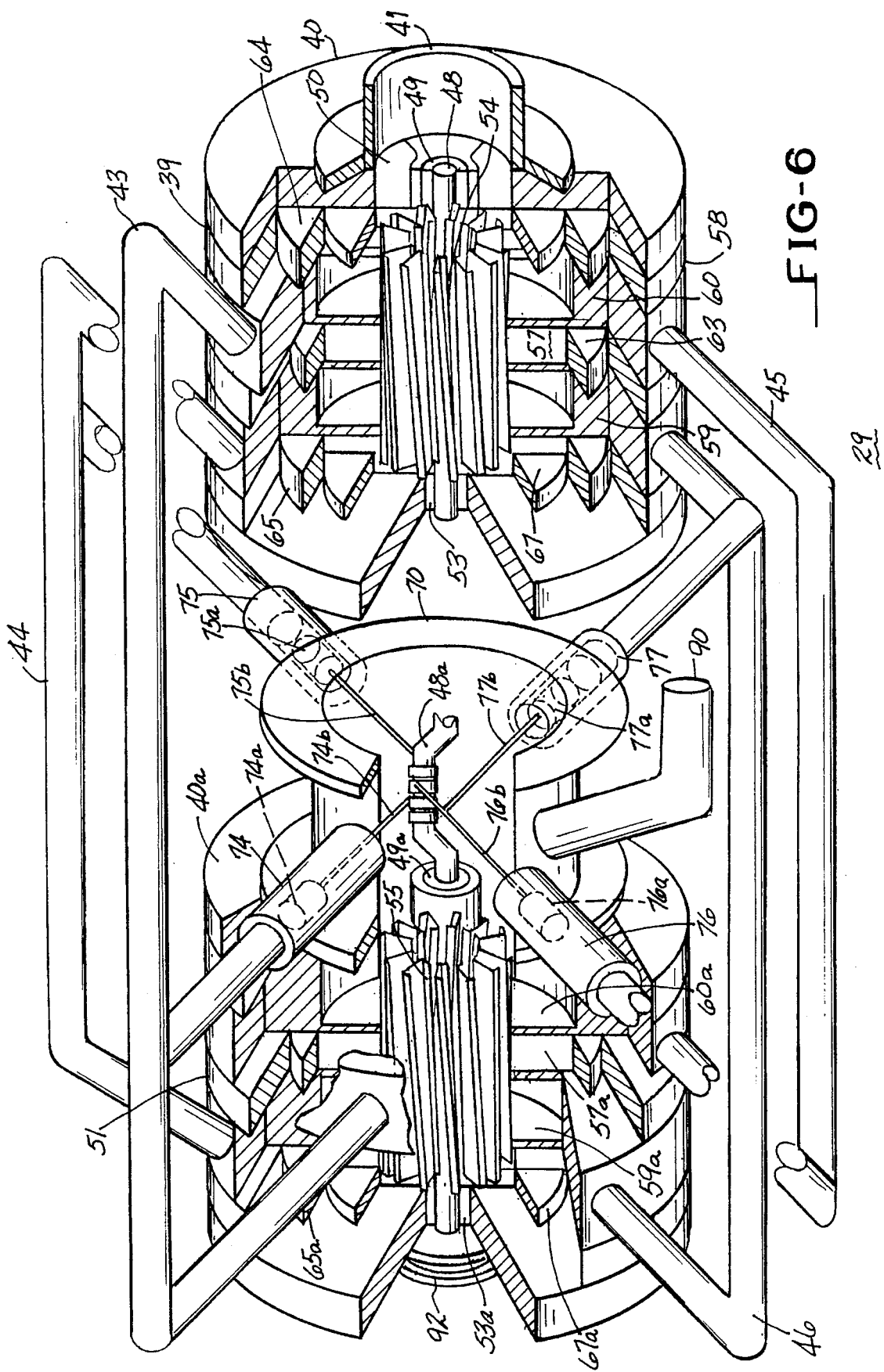
FIG. 6 is a perspective view partially in section of the turbine shown in FIGS. 2–5.

Reference is now made to FIGS. 3, 4, 5 and 6. The turbine 29 comprises a first pressure stage 39 and a second return stage 51. The turbine stages are seperated and joined by a piston-cylinder assembly housing 70. Shaft 48 is journaled in bearings 49, 53, 49a and 53a. Mounted to shaft 48 is a rotor including turbine rotor blades 54 (FIG. 5) in first stage 39 and and turbine blades 55 in second stage 48 (FIG. 6). For clarity of illustration and explanation the rotor blades are not shown in FIGS. 3 and 4.

The pressure side or first stage of the turbine is shown as comprising, in addition to end plate 40, laminated annulae. The annulae define a cavity 57 (FIG. 4) which receives therein a rotating assembly 58 (FIG. 3) which comprises two circular valves 59 and 60, each having a plurality of apertures 62 therein. The circular valves are separate by a spacer 63, and the apertures extend 180 degrees about the periphy of the circular valves. Rotating assembly further comprises end plates 64 and 65 and sealing members 66 and 67. The entire rotating assembly 65 is held together by bolts 68.

Reference is now made to FIG. 5 which shows the circular valve 60. The valve 60 is relieved to provide a channel as shown by the reference numeral 69. The channel 69 extends slightly less than 180 degrees. The rotating valves as represented by the valve 60 will provide passage of fluid under pressure to the associated pressure lines as hereinafter discussed.

In operation as thus far described, the fluid under pressure entering inlet 50 will act on rotor blades 54 and produce rotation of shaft 48 and assembly 58 will rotate therewith. The fluid in cavity 57 (FIG. 4) will exit through the apertures 62 in the valve rings, under pressure to pressure conduits 43 and 45. Fluid will exit through apertures 62 in valve ring 60 to pressure line 45 during a first 180 degree of rotation and through apertures 62 in valve ring 60 during the next 180 degrees of of rotation to pressure line 43. As will be apparent from of FIGS. 3 and 4, circular valve 60 feeds pressure conduits 43 and 45 (FIG. 3) while circular valve 59 feeds conduits 44 and 46 (FIG. 4).

Figure 3:
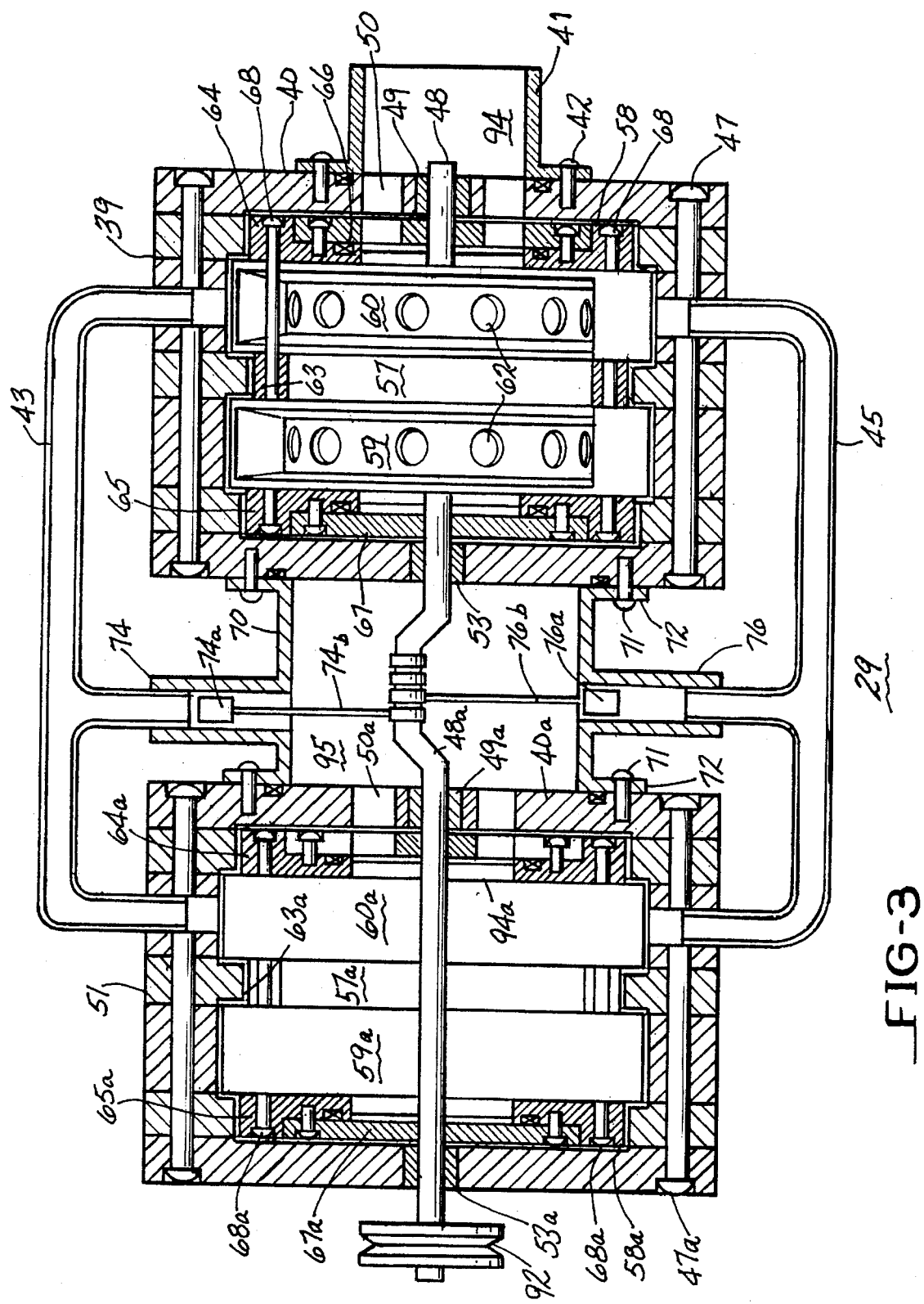
FIG. 3 is a longitudinal section of the turbine of FIG. 2 seen in the plane of lines 3—3 of FIG. 2.

The second or return stage 51 is identical in construction to the first stage herebefore described, and is identified by the same reference numerals of FIG. 3 with the suffix a.

Intermediate the first stage 39 and the second stage 51 is a piston-cylinder housing 70. Within housing 70 is at least one throw 48a on shaft 48. Housing 70 connects stages 39 and 51 by means of bolts 71 on annular flanges 72 thereof.

Figure 4:
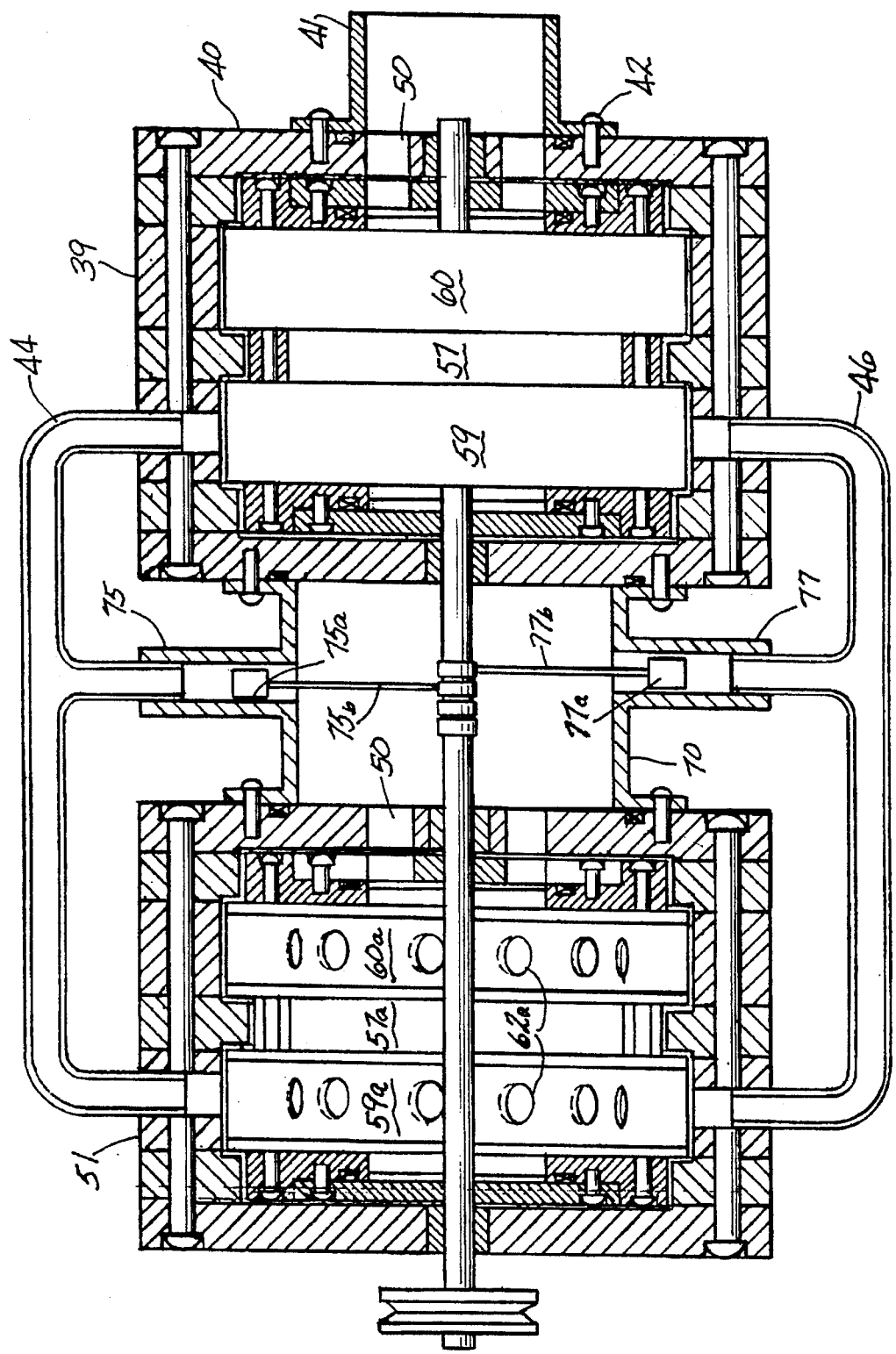
FIG. 4 is a longitudinal section of the turbine of FIG. 2 seen in the plane of lines 4—4 of FIG. 2

Housing 70 defines four cylinders 74 and 76 (FIG. 3) and 75 and 77 (FIG. 4). Each cylinder receives a piston 74a–77a having a rod 74b–77b connected to throw 48a on shaft 48. As disclosed the piston-cylinders are at ninety degrees to each other. The pressure in line 45 will iniatilly act on piston 76a in the cylinder shown at bottom dead center in FIG. 3 and will also pass through apertures 62a on rotating valve 60a in second stage 51 to act on turbine rotor vanes 55 to produce torque on shaft 48. The fluid is then exhausted through openings 50a in end plate 40a. The turbine could be constructed with a greater number of circular valves, pressure conduits and piston-cylinders. All of the piston-cylinders would be arranged symmetrically.

The arrangement of the piston-cylinder assemblies is such that geometrically only one piston at a time is allowed to reach top dead center per revolution of shaft 48. This allows the pistons to provide both pressure and exhaust. Each piston moves in a power stroke to produce torque on shaft 48 and in an exhaust stroke to deliver fluid to the second stage.

The fluid is exhausted from the piston-cylinder assembly through an exhaust port 90, line 32 and reservoirs 33.

In operation, in addition to that previously described, the pressure in conduits 43–46 due to the operation of the pressure side or first stage 39 of the turbine will produce rotation of shaft 48. As shown in FIGS. 3, 4 and 5, shaft 48 has a pulley drive 92 thereon adapted to be connected to a generator 30. Alternatively, shaft 48 may be directly connected to the shaft of a generator 30 (FIG. 1) through any suitable coupling mechanism including clutches.

The fluid pressure in conduits 43–46 drives the pistons in a power stroke. The second or exhaust stage feeds back the fluid through openings or apertures 94 in end plate 68a to a cavity 95 in piston-cylinder housing 70 and to tanks 33 from whence it is returned to acccumulator tanks 26 via line 36 through cylinder 22.

The fluid pressure in lines 43–46 acts to drive the pistons in a systematic order and also to drive the second stage to exhaust the fluid to the storage tanks 33 where it is redelivered to the accumulator tanks 26 through exhaust port 90.

As shaft 48 rotates fluid under pressure will be supplied to line 45 and drive piston 76a to bottom dead center as shown in FIG. 3. The fluid in line 45 is blocked from cavity 57a at this time by circular valve 60a which is 180 degrees out of phase with circular valve 60. Thus fluid will not enter cavity 57a until circular valve has rotated 180 degrees. During the next 180 degrees of rotation of shaft 48 piston 76a will move toward top dead center and exhaust fluid in cylinder 76 through apertures 62a in circular valve 60a to cavity 57a. the fluid is under pressure from piston 76a and will act on turbine blades and then exhaust through openings 50a in end plate 40a into housing 70. After 90 degrees of rotation of shaft 48 fluid will commence exiting under pressure through apertures 62 in circular valve 59 to line 46, and the pressurized fluid will commence acting on piston 77a in cylinder 77, commencing to drive piston 77a toward bottom dead center as shown in FIG. 4. When piston 77a has finished its power stroke and commences to move toward top dead center it will exhaust fluid under pressure from cylinder 77 through apertures 62a in circular valve 59a to cavity 57a to act on turbine blades 55. Then the fluid will exit through openings 50a in end plate 40a. This operation is then repeated as line 43 is pressurized by fluid in line 43 from circular valve 60 after 180 degrees of rotation of shaft 48. Piston 74a in cylinder 74 is driven toward top dead 48. As piston 74a moves toward top dead center, it exhausts fluid in cylinder 74 through line 43 to circular valve 60a and hence cavity 57a to act on turbine blades 55. The fluid is then exhausted through openings 50a in end plate 40a. At this point shaft 48 has rotated 270 degrees. During the final 90 degrees of rotation, line 44 will be pressurized and fluid will act on piston 75a to drive piston 75a toward bottom dead center. As piston 75a finishes its power stroke it moves toward top dead center and exhausts fluid through line 44 to circular valve 59a and hence to cavity 57a to act on turbine blades 55. The foregoing discussion of the operation of the turbine assumes a counter clockwise direction of rotation of shaft 48 as viewed in FIG. 2 with the lines being sequentially pressurized in the order 45, 46, 43 and 44.

A turbine embodying the invention will operate on variable fluid pressure, and is economical and efficient in operation.

It may thus be seen that the objects of the invention set forth, as well as those made apparent from the foregoing description, are efficiently attained. While a preferred embodiment of the invention has been set forth for purposes of disclosure, modification to the disclosed embodiment of the invention, as well as other embodiments thereof, may occur to those skilled in the art. Accordingly, the appended claims are intended to cover all embodiments of the invention and modifications to the disclosed embodiments which do not depart from the spirit and scope of the invention.

What is claimed is:

1. A turbine comprising first and second stages, said first stage being a power stage and said second stage an exhaust stage, a piston-cylinder assembly between said stages, a shaft extending between said stages and having at least one throw thereon in said piston-cylinder assembly, pressure conduit means extending from said first stage to the cylinders of said piston-cylinder assembly and to said second stage whereby fluid pressure from said first stage drives the pistons of said piston-cylinder assembly in a power stroke, the pistons of said piston-cylinder assembly upon the exhaust stroke thereof transferring fluid to said second stage to cause said second stage to exhaust fluid from said turbine.

2. A system including the turbine of claim 1, wherein fluid is supplied to said turbine from a pressure source and said turbine exhausts fluid to a reservoir, and means for transferring said fluid from said reservoir to said pressure source.

3. The turbine of claim 1 wherein said first and second stages have rotating valve assemblies which direct fluid under pressure first to said piston-cylinder assembly and then to said second stage through said pressure conduits.

4. The turbine or claim 3 wherein said valve assemblies each include at least two rotating valves which sequentially communicate with at least four pressure conduits to drive said piston-cylinder assembly.

5. The turbine of claim 4 wherein, said second stage includes at least two rotating valves which are out of phase with the rotating valves of said first stage and permit introduction of fluid to rotor blades on said shaft in said second stage upon the pistons of said piston cylinder assemblies returning toward top dead center.

6. The turbine of claim 1 wherein said piston-cylinder assembly supplies fluid under pressure to said second stage through said conduits upon the exhaust stroke of the pistons thereof.

7. The turbine of claim 6 wherein said piston-cylinder assembly is within a housing, a passage defined between said second stage and said housing to exhaust fluid from said second stage to said housing and further comprising an opening in said housing to exhaust fluid therefrom to a receptacle therefor.

8. The turbine of claim 1 wherein first rotor blades are on said shaft in said first stage.

9. The turbine of claim 8 wherein the fluid under pressure supplied to said first stage acts on said first rotor blades to produce a driving torque on said shaft.

10. The turbine of claim 9 wherein said pressure conduit means comprise a plurality of angularly spaced fluid lines.

11. The turbine of claim 9 further comprising a first rotating valve assembly on said shaft in said first stage, said first valve assembly selectively provides communication between said first stage and said fluid lines.

12. The turbine of claim 8 wherein second rotor blades are on said shaft in said second stage.

13. The turbine of claim 12 wherein the exhaust fluid from said piston-cylinder assembly acts on said second rotor blades to produce a driving torque on said shaft.

14. The turbine of claim 13 further including a second rotating valve assembly on said shaft in said second stage, said second valve assembly being in a phase relationship with said first valve assembly such that fluid is admitted to said second stage only during exhaust strokes of the pistons of said piston-cylinder assembly.

15. The turbine of claim 14 wherein said first rotating valve assembly includes an annular member having openings therein and which selectively provide and block communication between said first stage.

16. A turbine comprising first and second stages and a piston-cylinder assembly between said stages, a shaft extending through said first and second stages and said piston-cylinder assembly, said shaft having at least one throw thereon in said piston-cylinder assembly, said piston-cylinder assembly comprising a plurality of piston-cylinders with the pistons connected to said at least one throw, a plurality of fluid lines connected between said first stage and the cylinders of said piston-cylinders and adapted to transmit fluid under pressure from said first stage to the cylinders of said piston-cylinders, each of said pistons moving in a power stroke and an exhaust stroke, first rotor blades on said shaft in said first stage, second rotor blades on said shaft in said second stage, said fluid lines also connecting said cylinders to said second stage, means for supplying fluid under pressure to said first stage to act on said first rotor blades and produce torque on said shaft, first valving means on said shaft cylinders through said fluid lines to cause said pistons to selectively move in a power stroke, said cylinders transmitting fluid under pressure to said fluid line and to said second stage as the pistons thereof move in an exhaust stroke, second valving means on said shaft in said second stage, said first and second valving means being so related in phase that fluid under pressure in said fluid conduits from said first stage act only on said piston-cylinders and the exhaust fluid from said piston-cylinders acts on said second rotor blades in said second stage to produce torque on said shaft, and venting means for exhausting fluid from said second stage.

17. The turbine of claim 16 wherein each of said valving means comprises a circular member having apertures therein substantially 180° about the periphery thereof to provide communication between said stages and said conduits.

18. A system for converting water motion to electrical energy comprising water motion magnifying means, at least one float responsive to water motion having reciprocating vertical movement, a cylinder having a piston, means connecting said at least one float to drive said piston in said cylinder, accumulator means, reservoir means, first conduit means connecting said accumulator means to said cylinder to receive fluid under pressure from said cylinder, second conduit means connecting said accumulator means to said reservoir means, a turbine connected to said conduit means arranged to be driven by fluid flow in said second conduit, and electrical generating means arranged to be driven by said turbine, said turbine comprising first and second stages, said first stage being a power stage and said second stage an exhaust stage, a piston-cylinder assembly between said stages, a shaft extending between said stages and having at least one throw thereon between in said piston-cylinder assembly, pressure conduit means extending from said first stage to the cylinders of said piston-cylinder assembly and to said second stage whereby fluid pressure from said first stage drives the pistons of said piston-cylinder assembly in a power stroke, the pistons of said piston-cylinder assemblies upon the exhaust stroke thereof transferring fluid to said second stage to cause said second stage to exhaust fluid from said turbine.

19. The turbine of claim 1 wherein there are first rotor blades on said shaft in said first stage and second rotor blades on said shaft in said second stage, means for introducing fluid under pressure to said first stage to act on said first rotor blades and produce torque on said shaft, said piston-cylinder assembly transferring fluid under pressure to said second stage to act on said second rotor blades and produce torque on said shaft prior to exhaust of fluid from said second stage.

20. The turbine of claim 19 wherein said piston-cylinder assembly comprises a plurality of cylinders having pistons therein connected to said at least one throw.

* * * * *